D. PHILLIPS.
PILOT AND GUIDE STAFF FOR AUTOMOBILES.
APPLICATION FILED OCT. 11, 1912.
1,057,268. Patented Mar. 25, 1913.
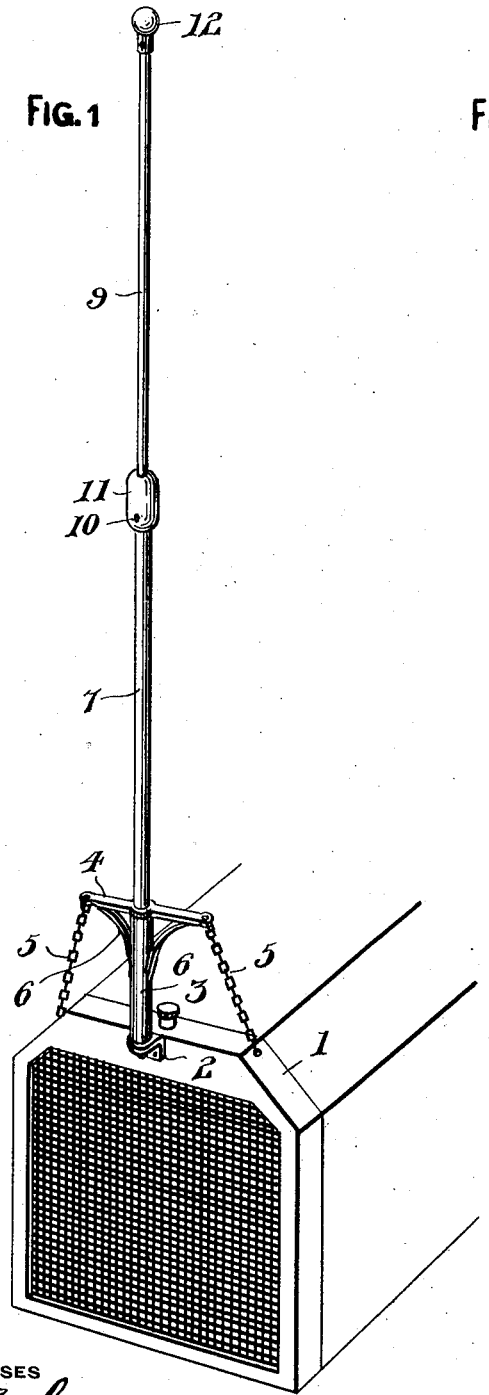
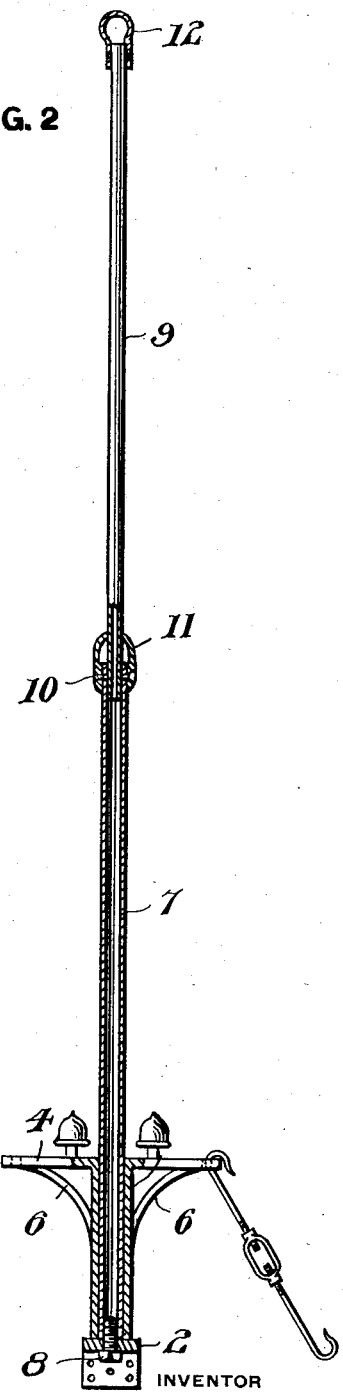
WITNESSES
INVENTOR
Daniel Phillips
By
ATTORNEYS

UNITED STATES PATENT OFFICE.

DANIEL PHILLIPS, OF DUQUESNE, PENNSYLVANIA.

PILOT AND GUIDE STAFF FOR AUTOMOBILES.

1,057,268.  Specification of Letters Patent.  Patented Mar. 25, 1913.

Application filed October 11, 1912. Serial No. 725,190.

*To all whom it may concern:*

Be it known that I, DANIEL PHILLIPS, a citizen of the United States of America, residing at Duquesne, in the county of Allegheny and State of Pennsylvania, have invented certain new and useful Improvements in Pilot and Guide Staves for Automobiles, of which the following is a specification, reference being had therein to the accompanying drawing.

This invention relates to a pilot and guide staff for automobiles, and the primary object of my invention is to provide the radiator or forward end of an automobile body with a staff that can be advantageously used by a pilot automobile for guiding other automobiles in a race or when touring.

Another object of this invention is to provide a telescopic staff that can be used as a flag or signal staff on the tops of buildings or other structures.

A further object of this invention is to provide a metallic pilot staff for automobiles that is simple in construction, durable, safe to use and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a perspective view of the pilot staff as applied to an automobile, and Fig. 2 is a front elevation of the same partly broken away and partly in section.

To put my invention into practice, I provide the radiator or forward end 1 of an automobile with an angle bracket 2 and mounted upon this bracket is a tubular vertical socket 3 having the upper end thereof provided with diametrically opposed lateral arms 4 that are connected to the radiator 1 by chains 5 or other flexible connections, to prevent the socket 3 from rotating upon the bracket. The outer ends of the arms 4 are connected to the socket 3 by braces 6.

Mounted in the socket 3 is a tubular metallic base section 7 having the lower end thereof retained within said socket by a set screw 8 that extends upwardly through the bracket.

Slidably mounted in the base section 7 is a tubular top section 9 that is held in an extended position relatively to the base section 7 by set screws 10 that also retain a cap 11 upon the upper end of the base section 7. The cap 11 serves as a guide and brace for the top section 9 when said section is extended. The upper end of the top section 9 is provided with a cap or ornamentation 12, preferably in the form of a ball or cylindrical body that can be gilded or finished whereby it can be observed at a long distance. The upper end of the top section 9 is also capable of supporting a flag or pennant and with the sections 7 and 9 of considerable length, the upper end of the top section 9 can be easily observed along a considerable stretch of road.

When the staff is not in use the top section 9 is telescoped by the base section 7 and the base section 7 can be used as a license card holder or as a support for a pennant.

What I claim is:—

A pilot staff for automobiles, comprising a bracket adapted to be secured to the forward end of an automobile, a tubular socket mounted upon said bracket, oppositely disposed lateral arms carried by the upper end of said socket and having the outer ends thereof connected to the forward end of an automobile, a tubular base section mounted in said socket, a set screw extending through said bracket into the lower end of said base section, a top section slidably mounted in said base section, means carried by the upper end of said base section for holding said top section in an extended position relatively to said base section, and a cap carried by the upper end of said top section.

In testimony whereof I affix my signature in the presence of two witnesses.

DANIEL PHILLIPS.

Witnesses:
MAX H. SROLOVITZ,
KATHERINE ERRETT.

Copies of this patent may be obtained for five cents each, by addressing the "Commissioner of Patents, Washington, D. C."